US010394637B2

(12) United States Patent
Agarwal et al.

(10) Patent No.: US 10,394,637 B2
(45) Date of Patent: Aug. 27, 2019

(54) SYSTEMS AND METHODS FOR DATA VALIDATION AND PROCESSING USING METADATA

(71) Applicant: American Express Travel Related Services Company, Inc., New York, NY (US)

(72) Inventors: Rahul Agarwal, Noida (IN); Sachin Arya, New Delhi (IN); Sastry Durvasula, Phoenix, AZ (US); Harish Naik, Phoenix, AZ (US); Satish Narayanan, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 612 days.

(21) Appl. No.: 14/846,179

(22) Filed: Sep. 4, 2015

(65) Prior Publication Data

US 2017/0068582 A1 Mar. 9, 2017

(51) Int. Cl.

| | |
|---|---|
| ***G06F 11/07*** | (2006.01) |
| ***G06F 11/30*** | (2006.01) |
| ***G06F 11/34*** | (2006.01) |
| ***G06F 16/25*** | (2019.01) |

(52) U.S. Cl.

CPC ........ *G06F 11/079* (2013.01); *G06F 11/0706* (2013.01); *G06F 11/076* (2013.01); *G06F 11/0772* (2013.01); *G06F 11/0787* (2013.01); *G06F 11/3006* (2013.01); *G06F 11/3452* (2013.01); *G06F 16/254* (2019.01)

(58) Field of Classification Search

CPC ......... G06F 17/30371; G06F 17/30569; G06F 17/30563; G06F 17/30377; G06F 17/30466; G06F 17/30489; G06F 17/30598; G06F 11/3006; G06F 11/3452; G06F 11/3409; G06F 11/079; G06F 11/0709; H04L 43/028

USPC ......................... 707/602, 756, 761, 802, 809

See application file for complete search history.

(56) References Cited

U.S. PATENT DOCUMENTS

2012/0254103 A1* 10/2012 Cottle ................... G06F 16/254 707/602

2013/0246376 A1* 9/2013 Padmanabhan ....... G06F 16/254 707/694

2015/0046389 A1* 2/2015 Dhayapule ............ G06F 11/079 707/602

* cited by examiner

*Primary Examiner* — David T. Brooks
*Assistant Examiner* — Berhanu Mitiku
(74) *Attorney, Agent, or Firm* — Snell & Wilmer L.L.P.

(57) ABSTRACT

A system receives a source and a metadata layer that describes the source. The source may comprise source records with fields containing source data, and the metadata layer may include metadata comprising at least one of a field data type, a field data length, a field description, or a record length. The processor may further validate the metadata layer against the source and write results to a log. The processor may further be configured for transforming the source records into transformed records for a load ready file. The processor may further balance a number of records in the source against a number of transformed records in the load ready file to generate a transformation failure rate.

20 Claims, 3 Drawing Sheets

SYSTEMS AND METHODS FOR DATA VALIDATION AND PROCESSING USING METADATA

FIELD

The present disclosure relates to metadata driven data validation, ingestion, and process automation in distributed computing environments.

BACKGROUND

Large data sets may exist in various levels of size and organization. With big data comprising data sets as large as ever, the volume of data collected incident to the increased popularity of online and electronic transactions continues to grow. For example, billions of records (also referred to as rows) and hundreds of thousands of columns worth of data may populate a single table. The large volume of data may be collected in a raw, unstructured, and undescriptive format in some instances.

Ingesting the big data sets may be a cost intensive process. In fact, processing inputs may comprise 50% or more of the time costs associated with using big data sets. The intake process may include numerous steps conducted with parallel processing and non-trivial user oversight. For example, a big data system may intake 100,000 records. The records may be distributed equally across 4 machines with 25,000 records processed by each machine.

In addition to parallel processing, big data systems may have a variety of intake approaches and/or algorithms requiring user management to input big data sets. Users may provide code to identify and place data in a usable form. Users may also oversee the intake data migration and processing to identify and handle errors. The manual nature of big data processing typically tends to increase the time spent on data intake.

SUMMARY

A system, method, and computer readable medium (collectively, the "system") is disclosed for ingesting data and monitoring the transformation of data sources into load ready files. The system may comprise receiving a source and a metadata layer that describes the source. The source may comprise source records with fields containing source data, and the metadata layer may include metadata comprising at least one of a field data type, a field data length, a field description, or a record length. The processor may further validate the metadata layer against the source and write results to a log. The processor may further be configured for transforming the source records into transformed records for a load ready file. The transformed records may comprise a derived field in response to a transformation applied to the fields containing the source data. A bad record may be written to the log in response to a failed data quality check and/or a failed transformation as specified in the metadata. The processor may further balance a number of records in the source against a number of transformed records in the load ready file to generate a transformation failure rate. This also ensures the data transferred between systems or stages within a system is accurate and complete. The system may further be configured to decide a state of transforming the source records, in response to the transformation failure rate and a predetermined acceptable failure rate. The processor may then output the load ready file.

In various embodiments, the system may display the transformation failure rate and the log. The processor may also distribute a plurality of processing tasks among a plurality of nodes for parallel processing. The load ready file may comprise a source field from the source records and a transformed field from the transformed records. The processor may decide the state is failed in response to the transformation failure rate exceeding the predetermined acceptable failure rate. The processor may then write the state to a summary log. The processor may also decide the state is successful in response to the transformation failure rate being less than the predetermined acceptable failure rate. The processor may be configured to output at least one of an exception log, a summary log, feed statistics, or a job status.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, big data may refer to partially or fully structured, semi-structured, or unstructured data sets including hundreds of thousands of columns and records. A big data set may be compiled, for example, from a history of purchase transactions over time, from web registrations, from social media, from records of charge (ROC), from summaries of charges (SOC), from internal data, and/or from other suitable sources. Big data sets may be compiled with or without descriptive metadata such as column types, counts, percentiles, and/or other interpretive-aid data points.

The present disclosure provides a system, method, and computer program product for managing big data sets using metadata driven processing. The system may receive one or more input data sources. Metadata describing the input data may be provided along with the input data or generated after the input data is received. A metadata layer may then be formed to enhance data validation and building steps. By using metadata to guide the data intake process, the system in the present disclosure may reduce data intake time and costs.

The data ingestion components enable automated creation of code and actions in response to metadata. The data ingestion components may also improve data integrity by providing controlled balancing between data being sent and data being received, read, staged, and/or loaded. By carrying out the transformation process using in-memory parallel processing, the source data can be transformed and analyzed at high rates. As a result, big data sets may be ingested efficiently and quickly using a platform-agnostic approach.

Figure 1:
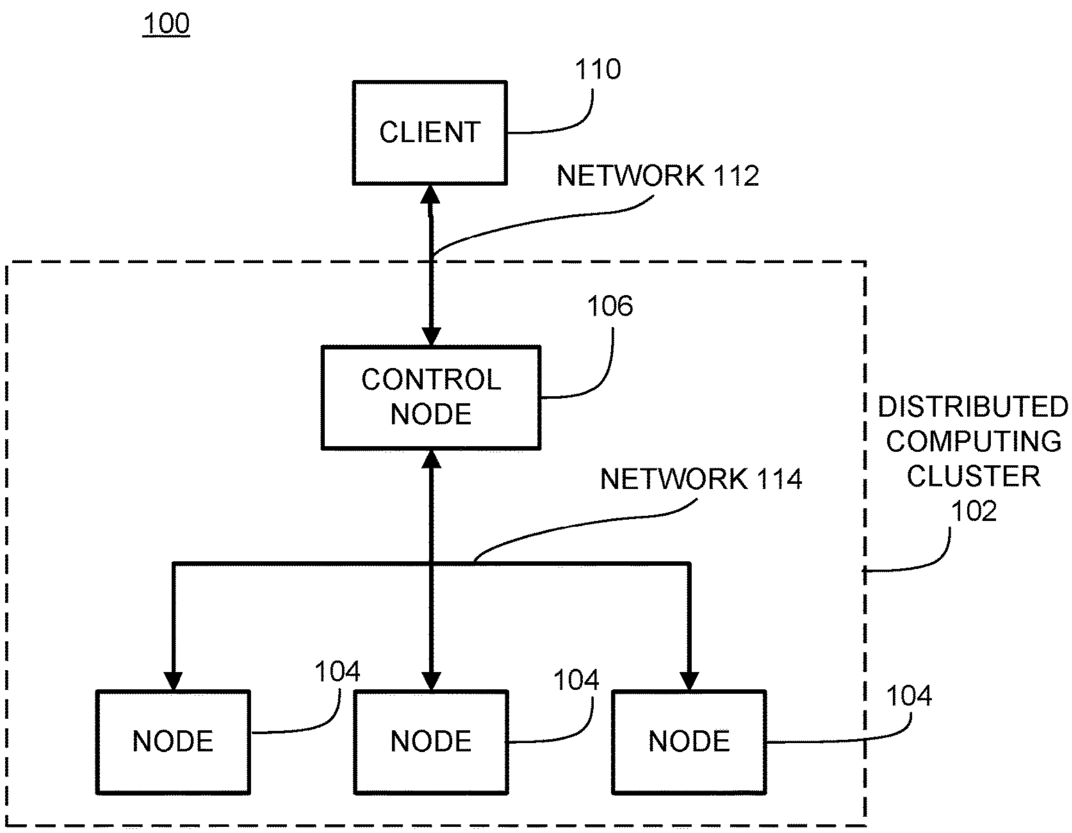
FIG. 1 illustrates an exemplary system for ingesting and processing big data sets, in accordance with various embodiments.

With reference to FIG. 1, a data extraction, transformation, and/or loading (ETL) system 100 is shown, in accordance with various embodiments. ETL system 100 comprises a distributed computing cluster 102 configured for parallel processing and storage. Distributed computing cluster 102 may comprise a plurality of nodes 104 in electronic communication with each of the other nodes as well as a control node 106. Processing tasks may be split among the nodes of distributed computing cluster 102 to improve throughput and enhance storage capacity. Distributed computing cluster may be, for example, a Hadoop® cluster configured to process and store big data sets with some of nodes 104 comprising a distributed file system and some of nodes 104 comprising a distributed processing system. In that regard, distributed computing cluster 102 and ETL system 100 may be configured to support a Hadoop® cluster version 2.7.1 or earlier as specified by the Apache Software Foundation which is located on its webpage at hadoop.apache.org/docs/.

In various embodiments, nodes 104, control node 106, and client 110 may comprise any devices capable of receiving and/or processing an electronic message via network 112 and/or network 114. For example, nodes 104 may take the form of a computer or processor, or a set of computers/processors, such as a system of rack-mounted servers. However, other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over the network.

In various embodiments, client 110 may submit requests to control node 106. Control node 106 may distribute the tasks among nodes 104 for processing to complete the job intelligently. Control node 106 may thus limit network traffic and enhance the speed at which incoming data is processed. In that regard, client 110 may be a separate machine from distributed computing cluster 102 in electronic communication with distributed computing cluster 102 via network 112. A network may be any suitable electronic link capable of carrying communication between two or more computing devices. For example, network 112 may be an internal TCP/IP network or an external network connection over the Internet. Nodes 104 and control node 106 may similarly be in communication with one another over network 114. Network 114 may be an internal network isolated from the Internet and client 110, or, network 114 may comprise an external connection to enable direct electronic communication with client 110 and the internet.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptography systems.

In various embodiments, ETL system 100 may process hundreds of thousands of records from a single data source. ETL system 100 may also ingest data from hundreds of data sources. Nodes 104 may process the data in parallel to expedite the processing. Furthermore, the transformation and intake of data as disclosed below may be carried out in memory on nodes 104. For example, in response to receiving a source data file of 100,000 records, a system with 100 nodes 104 may distribute the task of processing 1,000 records to each node 104. Each node 104 may then process the stream of 1,000 records while maintaining the resultant data in memory until the batch is complete. The results may be written, augmented, logged, and written to disk for subsequent retrieval.

Figure 2:
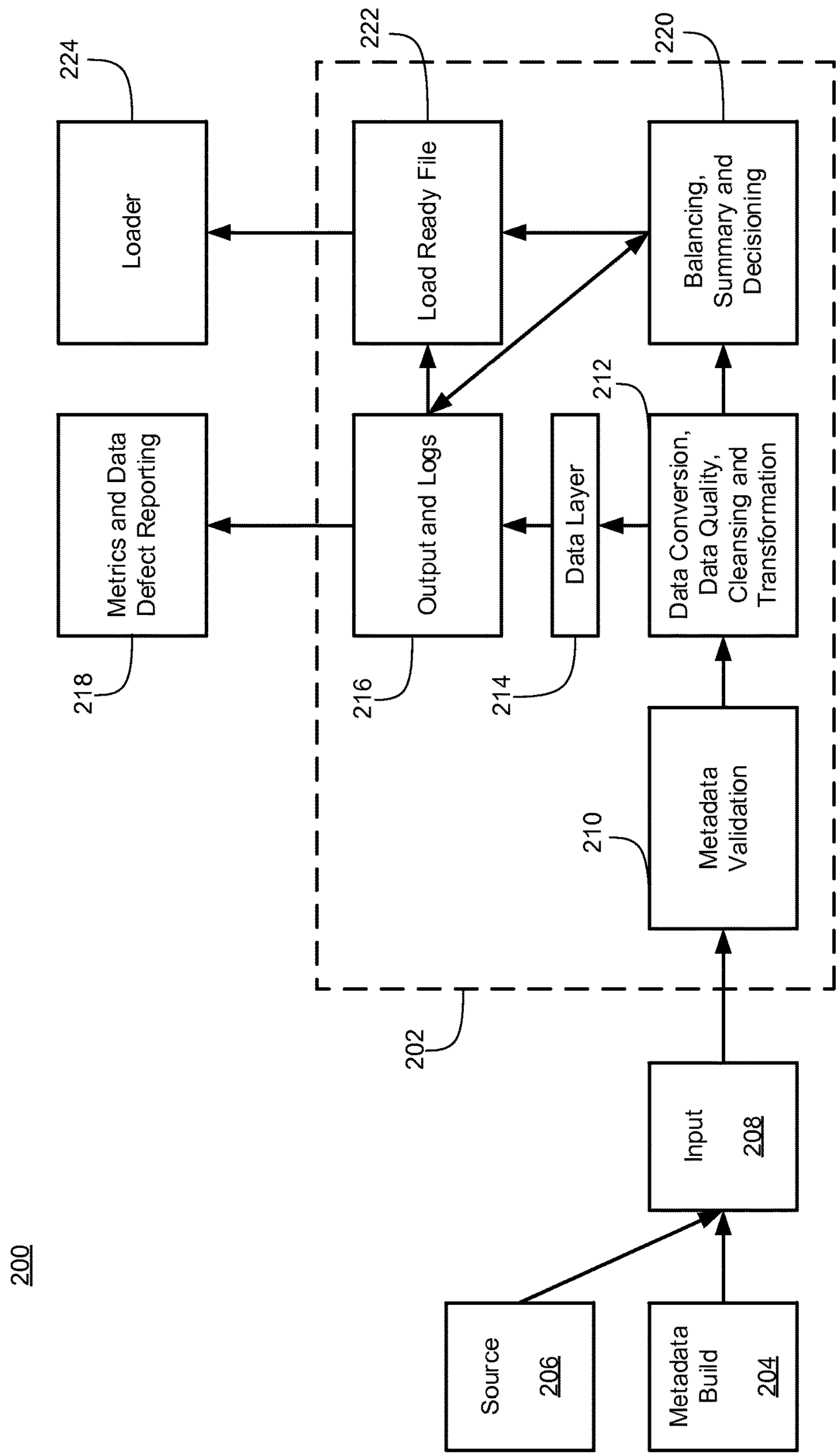
FIG. 2 illustrates an exemplary system architecture for data validation and processing, in accordance with various embodiments.

With reference to FIG. 2, system 200 for metadata driven data validation and processing of big data sets is shown, in accordance with various embodiments. System 200 may be constructed to run on hardware of ETL system 100. System 200 may begin with source 206 of data. Source 206 may be identified by a system of records (SOR) identifying a source type (e.g., whether the source is available on a mainframe or a database) and file type. Source 206 may comprise data in any electronic format including EBCDIC, ASCII, XML, JSON, DBMS formats, flat files, closed files, and/or any other type of electronic file format. Source 206 data files may be voluminous files with millions of records that may be processed to create a load ready file 222 capable of being loaded into the desired data structure by loader 224.

In various embodiments, a metadata build 204 may be created for the source or provided along with the source. Metadata build 204 may be a data structure containing metadata describing source 206 (i.e., details describing the data contained in the source). For example, metadata contained within metadata build 204 may include descriptive fields whether a field is numeric or character based, the type of information contained in the field (e.g., dates, names, addresses, phone numbers, account numbers, and/or identifying information), and/or the size of the field. Metadata build 204 and source 206 may both be a component of input 208.

In various embodiments, input 208 may be provided to distributed ingestion engine 202. Distributed ingestion engine 202 may be configured to support streaming parallelism. Streaming parallelism as used herein may describe a technique wherein distributed ingestion engine 202 may conduct multiple steps concurrently on the same data set. Each step may be reading from the previous step and writing to the subsequent step dynamically so that the steps may be conducted without waiting for the previous step to complete processing on an entire data set. Each record may be processed individually or in batches written to the next step for processing independent of other batches or records. In that regard, each process in distributed ingestion engine 202 may operate in parallel with upstream and downstream processes, thereby avoiding spillage of records out of memory and onto storage disks prior to completion. The streaming parallelism of distributed ingestion engine 202 may thus enhance processing speed by maintaining records in memory during processing and conducting multiple processing steps on input 208 concurrently.

Distributed ingestion engine 202 may include metadata validation and/or builder 210. Rules may be provided by a user to validate business metadata and/or technical metadata. Business metadata may include customized rules particular to a specific data application. For example, an account expiration date may not be earlier than the account start date. Similarly, account numbers must have a specific format and length. Technical metadata may include data types, field lengths, and other application agnostic descriptive data. For example, an integer field may only contain whole numbers. The system may use the rules to validate the quality of the metadata.

In various embodiments, distributed ingestion engine may evaluate input 208 to check whether metadata provided in metadata build 204 is valid. In response to a piece of metadata appearing inaccurate or incomplete, distributed ingestion engine 202 may correct or complete the piece of metadata and create a log entry indicating the corrected or completed metadata entry. In that regard, metadata validation and builder 210 may provide accurate and complete metadata for subsequent processing steps.

In various embodiments, the metadata layer may be subsequently processed on ETL system 100. The processing steps after validation comprise data conversion, data quality, and/or cleansing and transformation 212. Data conversion may comprise converting input 208 from an input type (e.g., excel, XML, GNU Scientific Library (GSL), Extended Binary Coded Decimal Interchange Code (EBCDIC), or other suitable source file format) for further processing to an ASCII understandable language. The tracking and transformation steps include deriving new data fields from the input data fields and tracking the history of transformation. In that regard, distributed ingestion engine 202 may provide the lineage (i.e., the original field and history of transformations applied in deriving the new field) for any data field in the load ready file 222.

In various embodiments, the data from source 206 may be processed by distributed ingestion engine 202 into a data layer 214 containing desired fields from the source 206, derived fields resulting from transformations applied to source 206, metadata describing the new set of processed data, and/or lineage data for the set of processed data. For example, transformations may include extracting a state field from a complete address field or trimming a numeric field to a desired number of characters. The original source fields may also be maintained so that the load ready file contains a combination of derived fields and source fields. The resulting output and logs 216 may be analyzed for metrics and reporting 218 using a debugging system to display the output of metrics and data defect reporting 218. Logs may include an exception log, a summary log, feed statistics, and/or job status. The output may include both good (i.e., successfully transformed) records and bad (i.e., unsuccessfully transformed) records.

In various embodiments, the debugging system may display bad source records to enable a user to view the problem record directly. The debugging system may further display the action taken in response to the error, the error type, and/or the status of the ingestion process. The bad record that caused the error in the ingestion process may also be displayed by the debugging system. The debugging system may further compare the number of bad records encountered and the total number of records in source 206 and/or the total number of records in load ready file 222. The debugging system may then display the number of bad records encountered relative to the number of total records using a counts and/or percentages. Bad records logged by distributed ingestion engine 202 may be displayed by debugging system. The bad record may also be displayed along with identifying details for the process such as a record ID, a source ID, a job ID, a transformation rule ID, a field name, a field value, a failure point, and/or other suitable information to assist users in analyzing failures.

In various embodiments, summary, balancing, and/or decisioning 220 may analyze the results of the data conversion, data quality, and/or cleansing and transformation 212. The system may balance the number of records read from source 206 and the total number of records in load ready file 222 to determine whether the numbers match. The system may also balance the number of failed rows against a predetermined acceptable number of failed records and/or the failure rate to a predetermined acceptable failure rate.

For example, a user may request that a column have a failure rate less than or equal to 100 failures, and the system may have recorded 50 failures during the import process. As a result, the system may decide that the import was a success as the actual failure rate is below the acceptable failure rate threshold. Similarly, the system may have recorded 101 failures for the identified column, which is in excess of the acceptable failure rate of 100 failed records, and may thus decide that the import has failed. The balancing data may be written to output and logs 216 in the form of a summary log for error reporting and debugging. The summary log may provide a list of all rules applied to one or more columns that experienced a transformation failure. System 200 may thus decide whether an import was successful or unsuccessful and take appropriate action. Appropriate action may include completely or partially aborting the input, continuing to process the import, logging errors, or querying a user for a desired action. In that regard, balancing, summary, and/or decisioning 220 may evaluate the success of the ingestion process and log the results of the evaluation.

In response to balancing, summary, and/or decisioning 220 deciding that the distributed ingestion engine 202 has successfully processed source 206, the load ready file 222 may be created. Load ready file 222 may be a data file containing the desired source columns and derived columns that have been successfully transformed. The load ready file may be in a format suitable for loading into a big data format such as HBase™, Solr™, Spark™, Hadoop®, XML, or data storage systems. If desired, load ready file 222 may also be in a flat file format. Load ready file 222 may also be loaded into a data system using loader 224.

Figure 3:
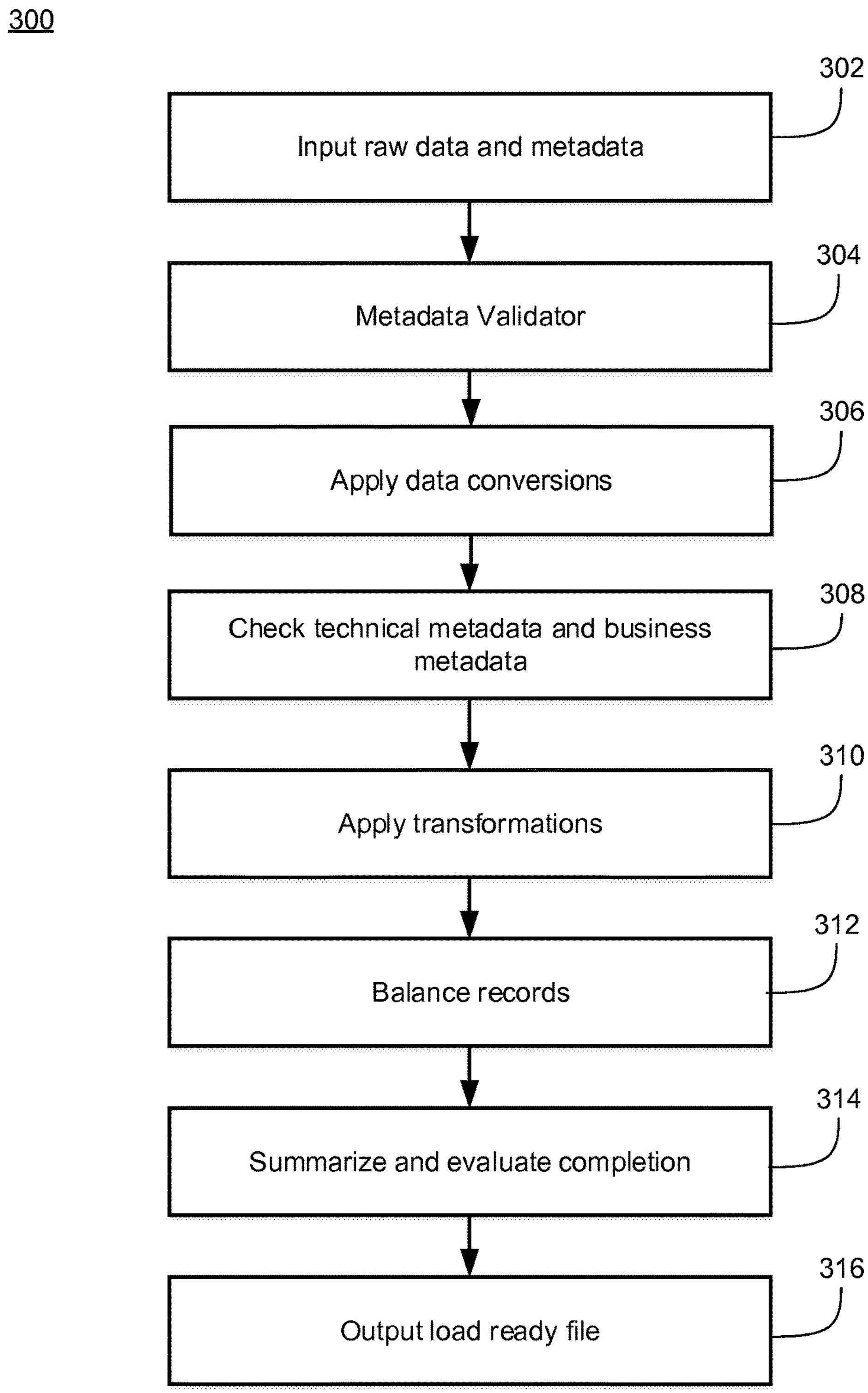
FIG. 3 illustrates an exemplary process for data validation and processing using metadata, in accordance with various embodiments.

With reference to FIG. 3, a method 300 for data intake using system 200 is shown, in accordance with various embodiments. Method 300 may begin by inputting raw data and metadata (Block 302). The input 208 may be in the form of source 206 and metadata build 204 as described above. System 200 may then pass input to a metadata validator (Block 304) for further processing. For example, data may be converted to an ASCII readable format for further processing using distributed ingestion engine 202.

In various embodiments, distributed ingestion engine 202 may then perform data conversion, data quality, and/or cleansing and transformation 212. System 200 may apply data conversions (Block 306) using metadata. The conversions may read metadata describing source columns and dynamically create corresponding target columns in load ready file 222. In that regard, the application of data conversions in Block 306 may determine the structure of load ready file 222, including the type of columns available in load ready file 222. System 200 may then check technical and business metadata (Block 308). Rules may be provided by a user to validate business metadata and/or technical metadata as disclosed above with reference to FIG. 2. System 200 may then apply transformations (Block 310). The transformations may be applied as described above to derive output fields for load ready file 222 from the input fields available in input 208.

In various embodiments, system 200 may complete balance processing (Block 312). Balancing may include comparing the number of records in load ready file 222 to the number of records in source 206 or to an expected number of records. If the number of records or fields in load ready file 222 is below a threshold number or percentage of expected records then system 200 may decide that the import has failed. System 200 may then summarize and evaluate completion (Block 314). Summarization may comprise writing the results of balance processing into a summary log. The summary log may provide a list of all rules applied to one or more columns that experienced a transformation failure. System 200 may detected a number a failed transforms due to bad records during the import. The system may then evaluate the number of bad records versus the threshold for bad records and decide that the import has been a success or failure. The system may output a load ready file 222 (Block 316). The load ready file and logs output by system 200 may be prepared for viewing or loading into a big-data format as disclosed above.

The systems and methods herein enable rapid ingestion of big data sets in a distributed computing environment. The metadata driven approach intake processing reduces source ingestion time, enhances reliability, and automates data intake. Furthermore, the platform agnostic nature of the present disclosure can operate on an input source in any electronic format. The error logging and reporting of the present disclosure further enable users to monitor progress and identify bad data based on predetermined or dynamically generated validation tolerances.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE®.pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet account), a communications port, a Personal Computer Memory Account International Association (PCMCIA) slot and account, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:

receiving, by a processor, a source, identifying, by the processor, the source with an source type and a file type;

receiving, by the processor, a metadata layer that describes the source, wherein the source comprises source records with source data fields containing source data, wherein the metadata layer includes metadata comprising at least one of a field data type, a field data length, a field description, or a record length;

validating, by the processor, the metadata layer against the source;

validating, by the processor and using rules, a quality of the metadata layer;

correcting, by the processor, the metadata in response to the metadata being inaccurate;

completing, by the processor, the metadata in response to the metadata being incomplete;

writing, by the processor, results to a log;

transforming, by the processor, the source records into transformed records in an ASCII readable format for a load ready file, performing, by the processor, data conversions by reading metadata describing source columns;

dynamically creating, by the processor and in the load ready file, target columns corresponding to the source columns;

determining, by the processor, a structure of the load ready file based on the target columns;

deriving, by the processor, new data fields from the source data fields to create derived fields in the transformed records;

tracking, by the processor, a history of the transforming in the load ready file;

detecting, by the processor, a number of failed transforms due to bad records during the importing;

writing, by the processor, the bad record to the log in response to a failed transformation;

evaluating, by the processor, the number of failed transforms with the bad records versus a threshold for the bad records to determine if the importing is a success or failure;

balancing, by the processor, a number of records in the source against a number of transformed records in the load ready file to generate a transformation failure rate;

deciding, by the processor, a state of the transforming the source records in response to the transformation failure rate and a predetermined acceptable failure rate; and outputting, by the processor, the load ready file.

2. The method of claim 1, further comprising displaying, by the processor, the transformation failure rate and the log.

3. The method of claim 1, further comprising creating, by the processor, the metadata layer.

4. The method of claim 1, wherein the load ready file comprises a source field from the source records and a transformed field from the transformed records.

5. The method of claim 1, wherein the deciding the state further comprises deciding, by the processor, the state is failed in response to the transformation failure rate exceeding the predetermined acceptable failure rate.

6. The method of claim 5, further comprising writing, by the processor, the state to a summary log.

7. The method of claim 1, further comprising creating columns in the load ready file based on the metadata layer.

8. The method of claim 1, wherein the processor is configured to use streaming parallelism.

9. A computer-based system, comprising:

a processor; and a tangible, non-transitory memory configured to communicate with the processor, the tangible, non-transitory memory having instructions stored thereon that, in response to execution by the processor, cause the processor to perform operations comprising:

receiving, by a processor, a source, identifying, by the processor, the source with an source type and a file type;

receiving, by the processor, a metadata layer that describes the source, wherein the source comprises source records with source data fields containing source data, wherein the metadata layer includes metadata comprising at least one of a field data type, a field data length, a field description, or a record length;

validating, by the processor, the metadata layer against the source;

validating, by the processor and using rules, a quality of the metadata layer;

correcting, by the processor, the metadata in response to the metadata being inaccurate;

completing, by the processor, the metadata in response to the metadata being incomplete;

writing, by the processor, results to a log;

transforming, by the processor, the source records into transformed records in an ASCII readable format for a load ready file, performing, by the processor, data conversions by reading metadata describing source columns;

dynamically creating, by the processor and in the load ready file, target columns corresponding to the source columns;

determining, by the processor, a structure of the load ready file based on the target columns;

deriving, by the processor, new data fields from the source data fields to create derived fields in the transformed records;

tracking, by the processor, a history of the transforming in the load ready file;

detecting, by the processor, a number of failed transforms due to bad records during the importing;

writing, by the processor, the bad record to the log in response to a failed transformation;

evaluating, by the processor, the number of failed transforms with the bad records versus a threshold for the bad records to determine if the importing is a success or failure;

balancing, by the processor, a number of records in the source against a number of transformed records in the load ready file to generate a transformation failure rate;

deciding, by the processor, a state of the transforming the source records in response to the transformation failure rate and a predetermined acceptable failure rate; and outputting, by the processor, the load ready file.

10. The computer-based system of claim 9, further comprising displaying, by the processor, the transformation failure rate and the log.

11. The computer-based system of claim 9, further comprising distributing, by the processor, a plurality of processing tasks among a plurality of nodes for parallel processing.

12. The computer-based system of claim 9, wherein the load ready file comprises a source field from the source records and a transformed field from the transformed records.

13. The computer-based system of claim 9, wherein the deciding the state further comprises deciding, by the processor, the state is failed in response to the transformation failure rate exceeding the predetermined acceptable failure rate.

14. The computer-based system of claim 13, further comprising writing, by the processor, the state to a summary log.

15. The computer-based system of claim 9, wherein the deciding the state further comprises deciding, by the processor, the state is successful in response to the transformation failure rate being less than the predetermined acceptable failure rate.

16. The computer-based system of claim 9, further comprising outputting, by the processor, at least one of an exception log, a summary log, feed statistics, or a job status.

17. An article of manufacture including a non-transitory, tangible computer readable storage medium having instructions stored thereon that, in response to execution by a processor, cause the processor to perform operations comprising:

receiving, by a processor, a source, identifying, by the processor, the source with an source type and a file type;

receiving, by the processor, a metadata layer that describes the source, wherein the source comprises source records with source data fields containing source data, wherein the metadata layer includes metadata comprising at least one of a field data type, a field data length, a field description, or a record length;

validating, by the processor, the metadata layer against the source;

validating, by the processor and using rules, a quality of the metadata layer;

correcting, by the processor, the metadata in response to the metadata being inaccurate;

completing, by the processor, the metadata in response to the metadata being incomplete;

writing, by the processor, results to a log;

transforming, by the processor, the source records into transformed records in an ASCII readable format for a load ready file, performing, by the processor, data conversions by reading metadata describing source columns;

dynamically creating, by the processor and in the load ready file, target columns corresponding to the source columns;

determining, by the processor, a structure of the load ready file based on the target columns;

deriving, by the processor, new data fields from the source data fields to create derived fields in the transformed records;

tracking, by the processor, a history of the transforming in the load ready file;

detecting, by the processor, a number of failed transforms due to bad records during the importing;

writing, by the processor, the bad record to the log in response to a failed transformation;

evaluating, by the processor, the number of failed transforms with the bad records versus a threshold for the bad records to determine if the importing is a success or failure;

balancing, by the processor, a number of records in the source against a number of transformed records in the load ready file to generate a transformation failure rate;

deciding, by the processor, a state of the transforming the source records in response to the transformation failure rate and a predetermined acceptable failure rate; and outputting, by the processor, the load ready file.

18. The article of claim 17, further comprising displaying, by the processor, the transformation failure rate and the log.

19. The article of claim 17, wherein the load ready file comprises a source field from the source records and a transformed field from the transformed records.

20. The article of claim 17, further comprising outputting, by the processor, at least one of an exception log, a summary log, feed statistics, or a job status.

* * * * *